G. B. PICKOP.
GREASE CUP.
APPLICATION FILED MAR. 27, 1919.
1,345,953.
Patented July 6, 1920.
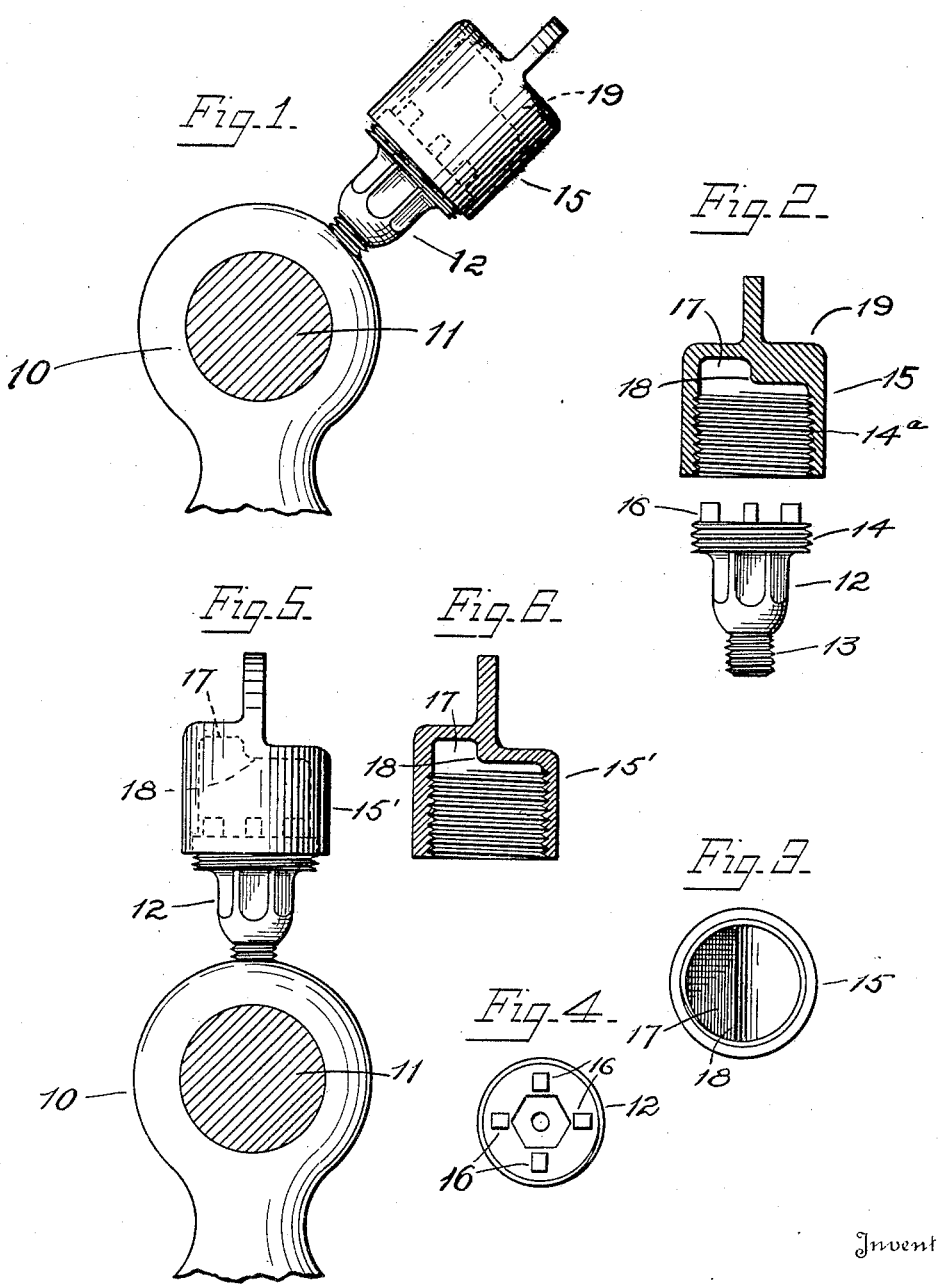
Inventor
George B. Pickop
By Henry E. Rockwell
Attorney

UNITED STATES PATENT OFFICE.

GEORGE B. PICKOP, OF NEW HAVEN, CONNECTICUT, ASSIGNOR TO THE MALLEABLE IRON FITTINGS COMPANY, OF BRANFORD, CONNECTICUT, A CORPORATION OF CONNECTICUT.

GREASE-CUP.

1,345,953.  Specification of Letters Patent.  Patented July 6, 1920.

Application filed March 27, 1919. Serial No. 285,417.

*To all whom it may concern:*

Be it known that I, GEORGE B. PICKOP, a citizen of the United States, residing in the city and county of New Haven, State of Connecticut, have invented certain new and useful Improvements in Grease-Cups, of which the following is a full, clear, and exact description.

This invention relates to grease cups, which are commonly used for holding lubricating grease to be supplied or fed to a certain part or parts to be lubricated. A grease cup ordinarily has a cap in threaded engagement with the body portion thereof, which cap serves to inclose and protect the grease in the body of the cup, and also acts as a follower which forces the grease out of the bottom of the cup to the bearing or part to be lubricated when the cap is screwed down on the body portion.

Where articles of this nature have been used on automobiles and other movable machinery, considerable inconvenience and annoyance have been caused by loss of the caps. In the case of an automobile, for example, the vibration of the car frequently causes the cap to work loose and fall off, as ordinarily no provision is made for retaining the cap in definite angular relation with respect to the body portion of the cup, and when the cap drops off the car, the chances of finding it are usually very small, and in any case, a good deal of annoyance is caused.

One object of my invention is to provide a grease cup with means constructed to coöperate with the grease confined therein to thereby cause the grease within the cup to prevent the cap from becoming accidentally unscrewed from the body portion of the cup.

Another object of my invention is to provide a grease cup cap which can be readily adjusted by screwing it up or down on the body portion of the cup, but which, nevertheless when once adjusted, will not be turned by shock or vibration in an unscrewing direction sufficiently to cause it to fall off the body portion of the cup.

Still another object of my invention is to provide a grease cup cap in which the center of gravity of the cup and grease confined therein is located eccentrically with respect to the threaded socket in the cap, whereby the unscrewing movement, due to vibration or the like, will be resisted and counteracted by an eccentric weight.

To these and other ends, the invention consists in the novel features and combinations of parts to be hereinafter described and claimed.

In the accompanying drawing:

Figure 1 is a side elevation of a grease cup embodying my improvements, shown secured in an inclined position to an element to be lubricated.

Fig. 2 is a view of the elements of the grease cup shown in Fig. 1, the body portion being shown in side elevation and the cap in section.

Fig. 3 is an inner end view of the grease cap shown in either Fig. 2 or Fig. 6.

Fig. 4 is a plan view of the body portion of the grease cup, the cap being removed.

Fig. 5 is a side elevation of a grease cup embodying a modification of my invention, the cup being shown applied in a vertical position upon an element to be lubricated; and Fig. 6 is a sectional view through the cap shown in Fig. 5.

In the drawing, I have designated by the numeral 10 a bearing member or the like, having a shaft or any other element 11 to be lubricated mounted therein. In Fig. 1 of the drawing, I have shown a grease cup secured to the bearing member 10, with its axis inclined to the vertical position, and provided with one type of grease cap embodying my invention; and in Fig. 5, I have shown my grease cup mounted in a vertical position upon the bearing member 10, the cup in this instance being provided with another type of cap embodying my invention.

My invention will first be described as provided with the type of grease cap shown in Figs. 1 and 2.

In the embodiment illustrated, I have shown a grease cup provided with the body portion 12, the lower end of which is threaded, as at 13, in the usual manner, in order that the same may be secured to the element to be lubricated, the upper end of this body portion is threaded, as at 14, and the body portion 12 may be given substantially any desired configuration, but it is preferable that the cup portion that is the portion about which the threads 14 are formed be rather shallow, in order that when the cap 15 is screwed down upon the body portion, substantially all the grease confined within the grease cup may be forced out of the same. Upon the upper face of the body portion 12 are formed a plurality of upwardly projecting lugs 16, four lugs being shown in the device illustrated, but it will be apparent that any desired number may be provided, and that they may be given any desired configuration. These lugs 16 are provided to project upwardly into the mass of grease confined within the grease cup, and to thereby prevent or tend to prevent the mass of grease confined within the cap 15 from rotating relatively to the body portion 12. The grease cap 15 is interiorly threaded, as at 14ª, which threads coöperate with the threads 14 upon the body member, and within this cap at the upper end of the same is preferably provided a pocket or the like 17, the same being positioned eccentrically with respect to the axis of rotation of the cap and is so constructed that a shoulder or projection 18 is provided, which will be engaged by the mass of grease confined within the grease cup. By providing the upwardly projecting lugs 16 upon the body portion and the pocket and shoulder, just mentioned, within the cap, the mass of grease confined within the grease cup will engage these projections 16 and 18, and thereby offer considerable resistance to a force tending to rotate the cap 15 in either direction relatively to the body portion 12. In this manner, the grease confined within the cup prevents the cap from becoming accidentally unscrewed from the body portion, it being apparent that considerable more force is required to rotate the cap relatively to the body portion, when the projections 16 and 18 are provided, to engage the opposite ends of the mass of grease confined within the grease cup, than would be required if these projections are omitted from both the upper face of the body portion and the interior of the cap, as in the usual type of grease cup now in general use.

In addition to the construction, just described, for preventing the grease cap from being accidentally rotated in an unscrewing direction, the cap is further provided with the eccentric weight 19, which is positioned to one side of the axis of rotation of the cap, as shown in Figs. 1 and 2, the arrangement being such that when the grease cup is mounted upon an element to be lubricated, so that the axis of the grease cup is inclined to the vertical position, the eccentric weight 19 formed upon the cap will tend to lie to the lower side of the grease cup, as shown in Fig. 1, whereby this eccentric weight will tend to resist any force, such as the vibrations, to which the grease cup may be submitted in actual use, from causing the cap to become accidentally unscrewed from the body portion of the cup. The eccentric weight 19 operates most satisfactorily to prevent the cap from being unscrewed from the body portion of the cup when the axis of the grease cup lies in a horizontal position, but the projecting lugs 16 and 18, above described, operate satisfactorily irrespective of the angular position of the axis of the cup to prevent the cap from becoming unscrewed from the body portion 12.

In Figs. 5 and 6, I have shown my grease cup provided with a modified type of cap 15′, but the operation of this cap whereby the same is prevented from being accidentally unscrewed from the body portion of the cup does not materially differ from the operation of the cap 15, above described. The body portion 12 shown in Fig. 5 is constructed the same as the body portion shown in Figs. 1 and 2, and operates in the same manner, and the cap 15′ is provided with a pocket 17 and shoulder 18, as in Figs. 1 and 2, which shoulder coöperates with the mass of grease confined within the grease cup in the manner above set forth. The grease cap 15′ differs from the grease cap 15 in that the eccentric weight 19 has been omitted, but since the mass of metal upon the side of the cap 15′ in which the pocket 17 is formed exceeds the mass of metal upon the opposite side of the cap, due to the fact that one side of the cap possesses a greater height than the other, the center of gravity of the cap 15′ will lie to one side of the axis of rotation of this cap. It will therefore be seen that the construction of the cap 15′ is such that the projection 18 tends to prevent the cap from being rotated relatively to the mass of grease confined therein and furthermore, if this cap is used upon a body portion, the axis of which is inclined to the vertical position, as in Fig. 1 of the drawing, the side of the cap 15′ in which the pocket 17 is formed will normally lie at the lower side of the cup, due to the fact that this side of the cap is heavier than the opposite side, and the weight of this side of the cap is increased somewhat by the mass of grease which is confined in the pocket 17, thereby displacing the center of gravity of the cap relatively to its axis of rotation sufficiently to prevent the cap from becoming accidentally unscrewed from the body portion 12.

From the above description, it is believed it will be apparent that I have devised a very satisfactory and simple construction for preventing a grease cap from becoming accidentally unscrewed from the body portion of the grease cup, it being understood that the vibration, which is responsible for the ordinary grease cap from being accidentally unscrewed from the grease cup proper, will never exert a very great force tending to turn the cap, so that any construction which will offer a relatively small amount of resistance to the rotation of the cap will be sufficient to prevent the same from becoming accidentally unscrewed. The lugs which I have provided upon both the body portion of the cup and upon the cap coöperate in a very satisfactory manner with the grease confined therein to prevent the cap from being rotated accidentally relatively to the body portion of the cup. In a relatively deep cap such as I have shown, the pocket 17 and shoulder 18 are not as essential as the lugs 16, since the friction between the walls of the cap and grease contained therein will, to a considerable extent, prevent the cap from rotating relatively to the mass of grease therein, and the projections 16 upon the body member 12, will prevent the mass of grease from rotating relatively to the member 12, and thereby prevent the cap from being accidentally rotated relatively to the body portion.

What I claim is:

1. In a grease cup, a body portion, a cap having threaded engagement therewith, and projections upon said body portion and cap positioned to project into the mass of grease confined within said grease cup, to thereby increase the resistance offered by the grease to a force tending to turn said cap in an unscrewing direction.

2. In a grease cup, a body portion, a cap having threaded engagement with said body portion, means for resisting a force tending to turn said cap in an unscrewing direction, comprising a projection upon said body portion positioned to project into the mass of grease confined within said grease cup to resist the rotation of said mass relative to said body portion.

3. In a grease cup, a body portion, a hollow grease containing cap having threaded engagement with said body portion, and means for preventing the accidental unscrewing of said cap, comprising projections carried by said body portion and positioned to project into the mass of grease confined within said grease cup to thereby increase the resistance offered by the grease to a force tending to turn said cap.

In witness whereof I have hereunto set my hand on the 25th day of March, 1919.

GEORGE B. PICKOP.